US011585896B2

(12) United States Patent
Harrison

(10) Patent No.: US 11,585,896 B2
(45) Date of Patent: *Feb. 21, 2023

(54) MOTION-BASED OBJECT DETECTION IN A VEHICLE RADAR USING CONVOLUTIONAL NEURAL NETWORK SYSTEMS

(71) Applicant: Metawave Corporation, Carlsbad, CA (US)

(72) Inventor: Matthew Paul Harrison, Palo Alto, CA (US)

(73) Assignee: METAWAVE Corporation, Carlsbad, CA (US)

( * ) Notice: Subject to any disclaimer, the term of this patent is extended or adjusted under 35 U.S.C. 154(b) by 306 days.

This patent is subject to a terminal disclaimer.

(21) Appl. No.: 16/781,152

(22) Filed: Feb. 4, 2020

(65) Prior Publication Data

US 2020/0249316 A1 Aug. 6, 2020

Related U.S. Application Data

(60) Provisional application No. 62/801,056, filed on Feb. 4, 2019.

(51) Int. Cl.
*G01S 7/41* (2006.01)
*G01S 13/931* (2020.01)

(52) U.S. Cl.
CPC ............... *G01S 7/417* (2013.01); *G01S 7/415* (2013.01); *G01S 13/931* (2013.01)

(58) Field of Classification Search
CPC ......... G01S 7/417; G01S 7/415; G01S 13/931

USPC ...................................................... 342/115, 70
See application file for complete search history.

(56) References Cited

U.S. PATENT DOCUMENTS

| 10,169,680 | B1* | 1/2019 | Sachdeva | G06T 15/30 |
|---|---|---|---|---|
| 10,514,462 | B2* | 12/2019 | England | G01S 7/4817 |
| 10,705,198 | B2* | 7/2020 | Santra | G01M 1/16 |
| 10,789,839 | B2* | 9/2020 | Kawai | G08G 1/04 |
| 2017/0316333 | A1* | 11/2017 | Levinson | B60W 60/00274 |
| 2017/0345300 | A1* | 11/2017 | Kawai | G08G 1/0133 |
| 2018/0335787 | A1* | 11/2018 | Zeng | G05D 1/0255 |
| 2019/0302252 | A1* | 10/2019 | Santra | G01F 1/663 |
| 2020/0175315 | A1* | 6/2020 | Gowaikar | G06K 9/00791 |
| 2020/0394909 | A1* | 12/2020 | Kawai | G01S 13/66 |

FOREIGN PATENT DOCUMENTS

CN 108226889 A * 6/2018 .......... G01S 7/4052

* cited by examiner

*Primary Examiner* — Erin F Heard
*Assistant Examiner* — Michael W Justice
(74) *Attorney, Agent, or Firm* — Sandra Lynn Godsey

(57) ABSTRACT

Examples disclosed herein relate to a radar system in an autonomous vehicle for object detection and classification. The radar system has a radar module having a dynamically controllable beam steering antenna and a perception module. The perception module includes a machine learning module trained on a first set of data and retrained on a second set of data to generate a set of object locations and classifications, and a classifier to use velocity information combined with the set of object locations and classifications to output a set of classified data.

20 Claims, 15 Drawing Sheets

MOTION-BASED OBJECT DETECTION IN A VEHICLE RADAR USING CONVOLUTIONAL NEURAL NETWORK SYSTEMS

CROSS-REFERENCE TO RELATED APPLICATIONS

This application claims priority from U.S. Provisional Application No. 62/801,056, titled "Motion-Based Object Detection in a Radar Using Convolutional Neural Network Systems," filed on Feb. 4, 2019, and incorporated herein by reference in its entirety.

BACKGROUND

Autonomous driving is quickly moving from the realm of science fiction to becoming an achievable reality. Already in the market are Advanced-Driver Assistance Systems ("ADAS") that automate, adapt and enhance vehicles for safety and better driving. The next step will be vehicles that increasingly assume control of driving functions such as steering, accelerating, braking and monitoring the surrounding environment and driving conditions to respond to events, such as changing lanes or speed when needed to avoid traffic, crossing pedestrians, animals, and so on. The requirements for object and image detection are critical and specify the time required to capture data, process it and turn it into action. All this while ensuring accuracy, consistency and cost optimization.

An aspect of making this work is the ability to detect and classify objects in the surrounding environment at the same or possibly at an even better level than humans. Humans are adept at recognizing and perceiving the world around them with an extremely complex human visual system that essentially has two main functional parts: the eye and the brain. In autonomous driving technologies, the eye may include a combination of multiple sensors, such as camera, radar, and lidar, while the brain may involve multiple artificial intelligence, machine learning and deep learning systems. The goal is to have full understanding of a dynamic, fast-moving environment in real time and human-like intelligence to act in response to changes in the environment.

BRIEF DESCRIPTION OF THE DRAWINGS

The present application may be more fully appreciated in connection with the following detailed description taken in conjunction with the accompanying drawings, which are not drawn to scale and in which like reference characters refer to like parts throughout, and wherein.

DETAILED DESCRIPTION

Methods and apparatuses for motion-based object detection in a vehicle radar using convolutional neural network systems are disclosed. The methods and apparatuses include the acquisition of raw data from a radar in an autonomous vehicle and the processing of that data through a perception module to extract information about multiple objects in the vehicle's Field-of-View ("FoV"). This information may be parameters, measurements or descriptors of detected objects, such as location, size, speed, object categories, and so forth. The objects may include structural elements in the vehicle's FoV such as roads, walls, buildings and road center medians, as well as other vehicles, pedestrians, bystanders, cyclists, plants, trees, animals and so on. The radar incorporates an antenna that is dynamically controlled such as to change its electrical or electromagnetic configuration to enable beam steering. The dynamic control is aided by the perception module, which upon identifying objects in the vehicle's FoV, informs the antenna where to steer its beams and focus on areas of interest.

In various examples, the perception module applies transfer learning to a Convolutional Neural Network ("CNN") that is trained extensively on lidar data to retrain it to identify objects on radar data. Doing so enables the network to learn a task for which there is a lot of high quality data and then specialize to a new task with far less new data. The CNN is first trained to identify objects in lidar point clouds. The lidar dataset used in training contains around 10,000 lidar point clouds with corresponding object labels and camera images. Once the CNN is trained to recognize objects in lidar point clouds, the CNN is retrained to identify objects in radar data. Retraining may be done using a combination of synthesized data and real radar data, which requires labeling the data by placing a bounding box around every object in view in a 3D environment. Retraining the CNN also requires the radar data to be pre-processed as radar data is 4D data including the range, velocity, azimuthal angles and elevation angles of radar RF beams radiated off of objects.

It is appreciated that, in the following description, numerous specific details are set forth to provide a thorough understanding of the examples. However, it is appreciated that the examples may be practiced without limitation to these specific details. In other instances, well-known methods and structures may not be described in detail to avoid unnecessarily obscuring the description of the examples. Also, the examples may be used in combination with each other.

Figure 1:
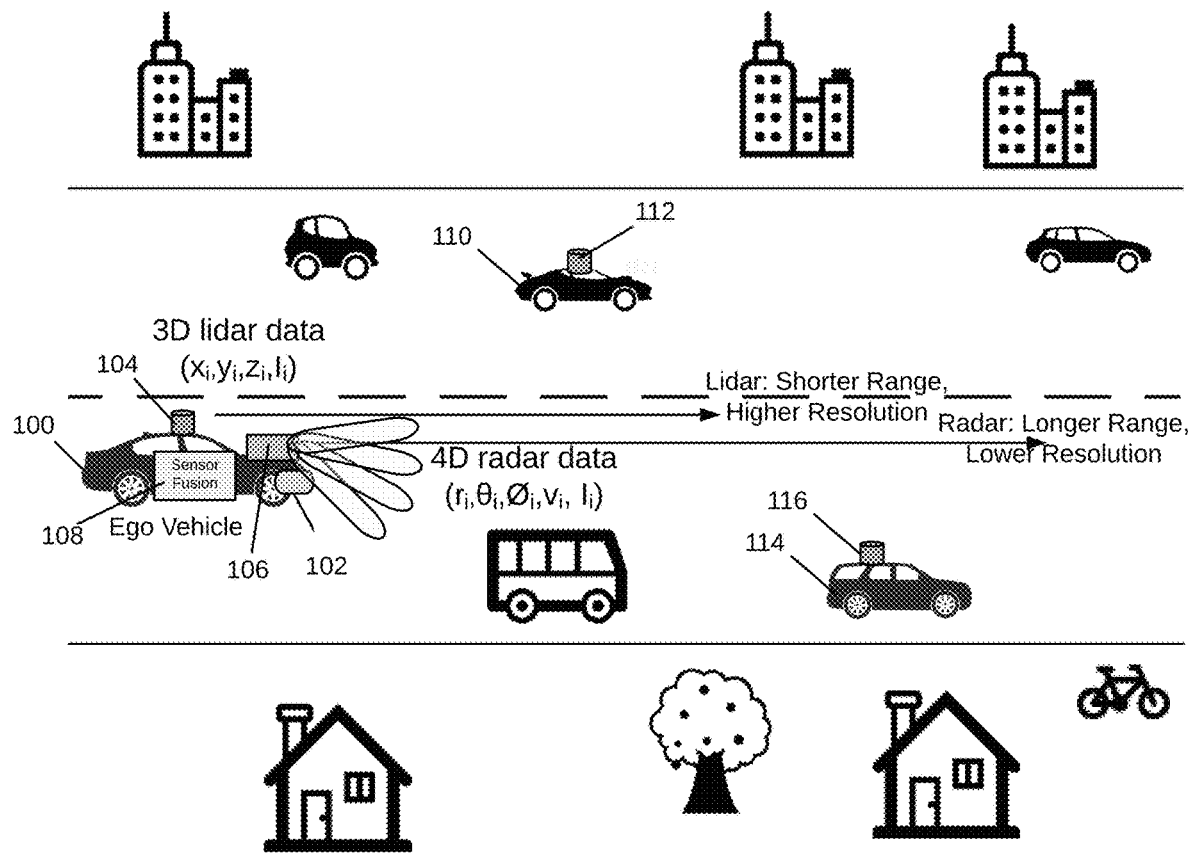
FIG. 1 illustrates an example environment in which a radar in an autonomous vehicle is used to detect and identify objects, according to various implementations of the subject technology.

FIG. 1 illustrates an example environment in which a radar in an autonomous vehicle is used to detect and identify objects. Ego vehicle 100 is an autonomous vehicle having multiple perception sensors, including camera 102, lidar 104, and radar 106, among others. Camera sensor 102 may be used to detect visible objects and conditions and to assist in the performance of various functions. The lidar sensor 104 can also be used to detect objects outside the ego vehicle 100 and provide this information to adjust control of the vehicle. This information may include information such as congestion on a highway, road conditions, and other conditions that would impact the sensors, actions or operations of the vehicle. Camera sensors are currently used in Advanced Driver Assistance Systems ("ADAS") to assist drivers in driving functions such as parking (e.g., in rear view cameras). Cameras are able to capture texture, color and contrast information at a high level of detail, but similar to the human eye, they are susceptible to adverse weather conditions and variations in lighting. Camera 102 may have a high resolution but cannot see objects beyond 50 meters.

Lidar sensors measure the distance to an object by calculating the time taken by a pulse of light to travel to an object and back to the sensor. When positioned on top of a vehicle, lidars are able to provide a 360° 3D view of the surrounding environment. However, lidar sensors such as lidar 104 are still prohibitively expensive, bulky in size, sensitive to weather conditions and are limited to shorter ranges (typically up to 150-250 meters). Radars, on the other hand, have been used in vehicles for many years and operate in all-weather conditions. Radars also use far less processing than the other types of sensors and have the advantage of detecting objects behind obstacles and determining the speed of moving objects. When it comes to resolution, lidars' laser beams are focused on small areas, have a smaller wavelength than RF signals, and are able to achieve around 0.25 degrees of resolution.

In various examples and as described in more detail below, radar 106 is capable of providing a 360° true 3D vision and human-like interpretation of the ego vehicle's path and surrounding environment. The radar 106 is capable of shaping and steering RF beams in all directions in a 360° FoV with a dynamically controlled antenna and recognize objects quickly and with a high degree of accuracy over a long range of around 300 m or more. The short range capabilities of camera 102 and lidar 104 along with the long range capabilities of radar 106 enable a sensor fusion module 108 in ego vehicle 100 to enhance its object detection and identification.

Figure 2:
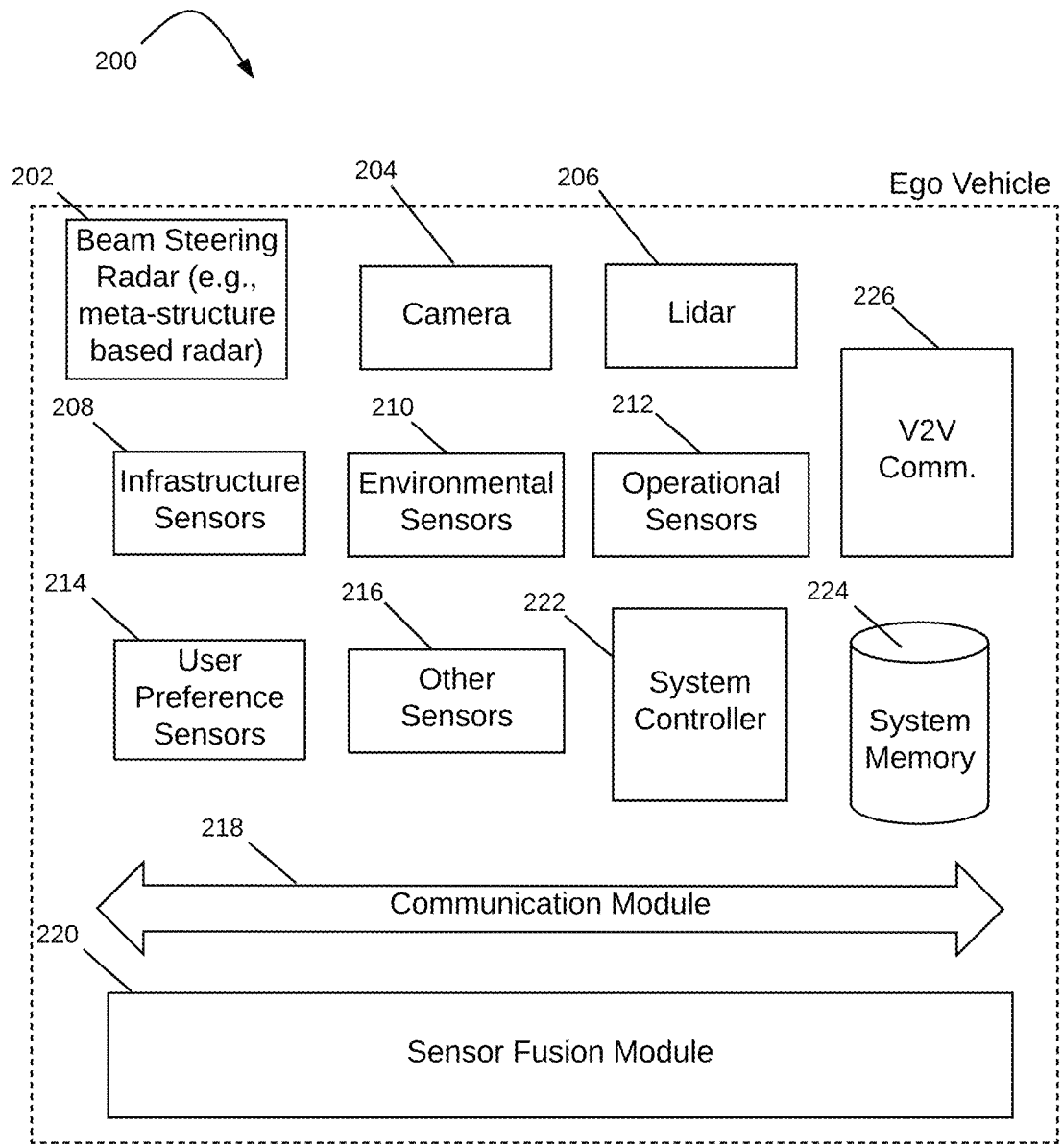
FIG. 2 is a schematic diagram of an autonomous driving system for an autonomous vehicle according to various implementations of the subject technology.

Attention is now directed to FIG. 2, which illustrates a schematic diagram of an autonomous driving system for an ego vehicle in accordance with various examples. Autonomous driving system 200 is a system for use in an ego vehicle that provides some or full automation of driving functions. The driving functions may include, for example, steering, accelerating, braking, and monitoring the surrounding environment and driving conditions to respond to events, such as changing lanes or speed when needed to avoid traffic, crossing pedestrians, animals, and so on. The autonomous driving system 200 includes a beam steering radar 202 and other sensor systems such as camera 204, lidar 206, infrastructure sensors 208, environmental sensors 210, operational sensors 212, user preference sensors 214, and other sensors 216. Autonomous driving system 200 also includes a communications module 218, a sensor fusion module 220, a system controller 222, a system memory 224, and a V2V communications module 226. It is appreciated that this configuration of autonomous driving system 200 is an example configuration and not meant to be limiting to the specific structure illustrated in FIG. 2. Additional systems and modules not shown in FIG. 2 may be included in autonomous driving system 200.

In various examples, radar 202 is beam steering radar capable of generating narrow, directed beams that can be steered to any angle (i.e., from 0° to 360°) across a FoV to detect objects. The beams are generated and steered in the analog domain, while processing of received radar signals for object detection and identification is performed with advanced signal processing and machine learning techniques. Radar 202 includes a meta-structure based antenna for providing dynamically controllable and steerable beams that can focus on one or multiple portions of a 360° FoV of the vehicle. The beams radiated from the meta-structure are reflected back from objects in the vehicle's path and surrounding environment and received and processed by the radar 202 to detect and identify the objects. Radar 202 includes a perception module that is trained to detect and identify objects and control the antenna as desired. Camera sensor 204 and lidar 206 may also be used to identify objects in the path and surrounding environment of the ego vehicle, albeit at a much lower range.

Infrastructure sensors 208 may provide information from infrastructure while driving, such as from a smart road configuration, bill board information, traffic alerts and indicators, including traffic lights, stop signs, traffic warnings, and so forth. This is a growing area, and the uses and capabilities derived from this information are immense. Environmental sensors 210 detect various conditions outside, such as temperature, humidity, fog, visibility, precipitation, among others. Operational sensors 212 provide information about the functional operation of the vehicle. This may be tire pressure, fuel levels, brake wear, and so forth. The user preference sensors 214 may be configured to detect conditions that are part of a user preference. This may be temperature adjustments, smart window shading, etc. Other sensors 216 may include additional sensors for monitoring conditions in and around the vehicle.

In various examples, the sensor fusion module 220 optimizes these various functions to provide an approximately comprehensive view of the vehicle and environments. Many types of sensors may be controlled by the sensor fusion module 220. These sensors may coordinate with each other to share information and consider the impact of one control action on another system. In one example, in a congested driving condition, a noise detection module (not shown) may identify that there are multiple radar signals that may interfere with the vehicle. This information may be used by a perception module in radar 202 to adjust the beams of the meta-structure antenna so as to avoid these other signals and minimize interference.

In another example, environmental sensor 210 may detect that the weather is changing, and visibility is decreasing. In this situation, the sensor fusion module 220 may determine to configure the other sensors to improve the ability of the vehicle to navigate in these new conditions. The configuration may include turning off camera or lidar sensors 204-206 or reducing the sampling rate of these visibility-based sensors. This effectively places reliance on the sensor(s) adapted for the current situation. In response, the perception module configures the radar 202 for these conditions as well. For example, the radar 202 may reduce the beam width to provide a more focused beam, and thus a finer sensing capability.

In various examples, the sensor fusion module 220 may send a direct control to the meta-structure antenna based on historical conditions and controls. The sensor fusion module 220 may also use some of the sensors within system 200 to act as feedback or calibration for the other sensors. In this way, an operational sensor 212 may provide feedback to the perception module and/or the sensor fusion module 220 to create templates, patterns and control scenarios. These are based on successful actions or may be based on poor results, where the sensor fusion module 220 learns from past actions.

Data from sensors 202-216 may be combined in sensor fusion module 220 to improve the target detection and identification performance of autonomous driving system 200. Sensor fusion module 220 may itself be controlled by system controller 222, which may also interact with and control other modules and systems in the vehicle. For example, system controller 222 may turn the different sensors 202-216 on and off as desired, or provide instructions to the vehicle to stop upon identifying a driving hazard (e.g., deer, pedestrian, cyclist, or another vehicle suddenly appearing in the vehicle's path, flying debris, etc.)

All modules and systems in autonomous driving system 200 communicate with each other through communication module 218. Autonomous driving system 200 also includes system memory 224, which may store information and data (e.g., static and dynamic data) used for operation of system 200 and the ego vehicle using system 200. V2V communications module 226 is used for communication with other vehicles. The V2V communications may also include information from other vehicles that is invisible to the user, driver, or rider of the vehicle, and may help vehicles coordinate to avoid an accident.

Figure 3:
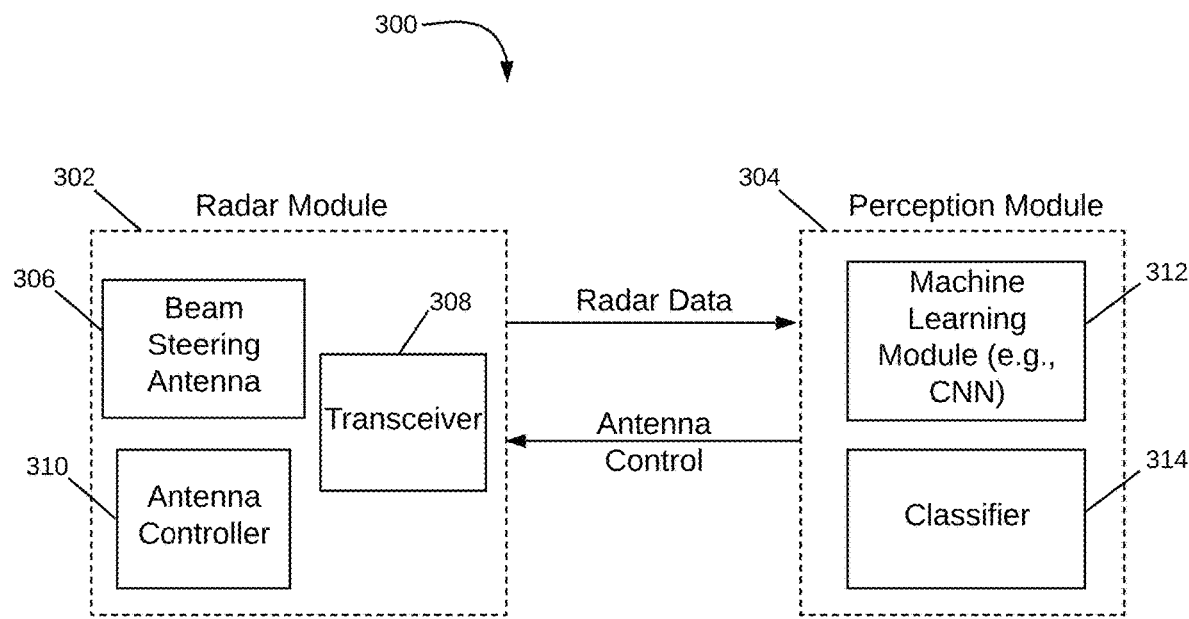
FIG. 3 is a schematic diagram of a radar as in FIG. 2 and according to various implementations of the subject technology.

FIG. 3 illustrates a schematic diagram of a radar as in FIG. 2 in accordance with various examples. Radar 300 is a "digital eye" with true 3D vision and capable of a human-like interpretation of the world. The "digital eye" and human-like interpretation capabilities are provided by two main modules: radar module 302 and a perception module 304. The radar module 302 includes a beam steering antenna (e.g., a meta-structure antenna) for providing dynamically controllable and steerable beams that can focus on one or multiple portions of a 360° FoV of an autonomous ego vehicle. A meta-structure, as generally defined herein, is an engineered structure capable of controlling and manipulating incident radiation at a desired direction based on its geometry. The meta-structure antenna may include various structures and layers, including, for example, a feed or power division layer to divide power and provide impedance matching, an RF circuit layer to provide phase control among other functions, and a meta-structure antenna layer with multiple microstrips, gaps, patches, vias, and so forth. Various configurations, shapes, designs and dimensions may be used to implement specific designs and meet specific constraints. In some examples, radar module 302 may include an array antenna such as a series fed array.

Antenna control is provided in part by the perception module 304. Radar data generated by the radar module 302 is provided to the perception module 304 for object detection and identification. The radar data is acquired by the transceiver 308, which has a radar chipset capable of transmitting the RF signals generated by the beam steering antenna 306 and receiving the reflections of these RF signals. Object detection and identification in perception module 304 is performed in a Machine Learning Module ("MLM") 312 and in a classifier 314. Upon identifying objects in the FoV of the vehicle, the perception module 304 provides antenna control data to antenna controller 310 in radar module 302 for adjusting the beam steering and beam characteristics as needed. For example, the perception module 304 may detect a cyclist on the path of the vehicle and direct the radar module 302 to focus additional RF beams at a given phase shift and direction within the portion of the FoV corresponding to the cyclist's location.

The MLM 312, in various examples, implements a CNN that is first trained on lidar data and then retrained on radar data using transfer learning. In various examples, CNN 502 is a fully convolutional neural network ("FCN") with three stacked convolutional layers from input to output (additional layers may also be included in the CNN). Each of these layers has 64 filters and performs a rectified linear activation function and batch normalization as a substitute for traditional L2 regularization. Unlike many FCNs, the data is not compressed as it propagates through the network because the size of the input is relatively small and runtime requirements are satisfied without compression.

The classifier 314 may also include a CNN or other object classifier to enhance the object identification capabilities of perception module 304 with the use of the velocity information and micro-doppler signatures in the radar data acquired by the radar module 302. When an object is moving slowly, or is moving outside a road lane, then it most likely is not a motorized vehicle, but rather a person, animal, cyclist and so forth. Similarly, when one object is moving at a high speed, but lower than the average speed of other vehicles on a highway, the classifier 314 uses this velocity information to determine if that vehicle is a truck, which tends to move more slowly. The location of the object, such as in the far-right lane of a highway can also indicate a slower-moving type vehicle. If the movement of the object does not follow the path of a road, then the object may be an animal, such as a deer, running across the road. All of this information may be determined from a variety of sensors and information available to the vehicle, including information provided from weather and traffic services, as well as from other vehicles or the environment itself, such as smart roads and smart traffic signs.

Note that velocity information is unique to radar sensors. Lidar data is in the form of 3D lidar point clouds having data tuples of the form $(r_i, \theta_i, \phi_i, I_i)$, with $r_i, \theta_i, \phi_i$ representing the coordinates of a point in space where $r_i$ denotes the distance between the lidar and the object along its line of sight, $\theta_i$ is the azimuthal angle, and $\phi_i$ is elevation angle. $I_i$ indicates the intensity or amount of light energy that is reflected off the object and returned to lidar 104. Conversely, radar data is in a 4D format having data tuples of the form $(r_i, \theta_i, \phi_i, I_i, v_i)$, where $I_i$ is the intensity or reflectivity indicating the amount of transmitted power returned to the radar receiver and $v_i$ is a radar specific parameter indicating the velocity of the object. Note that as the radar data has additional velocity information that is not present in the lidar data, object detection and identification is enhanced by the classifier 314. Note also that this means that training the CNN and using the trained CNN to detect and identify objects requires the radar data to be treated differently than lidar data. In particular and as described below with reference to FIGS. 13-15, the radar data can be treated differently depending on whether objects are stationary or in movement.

Figure 4:
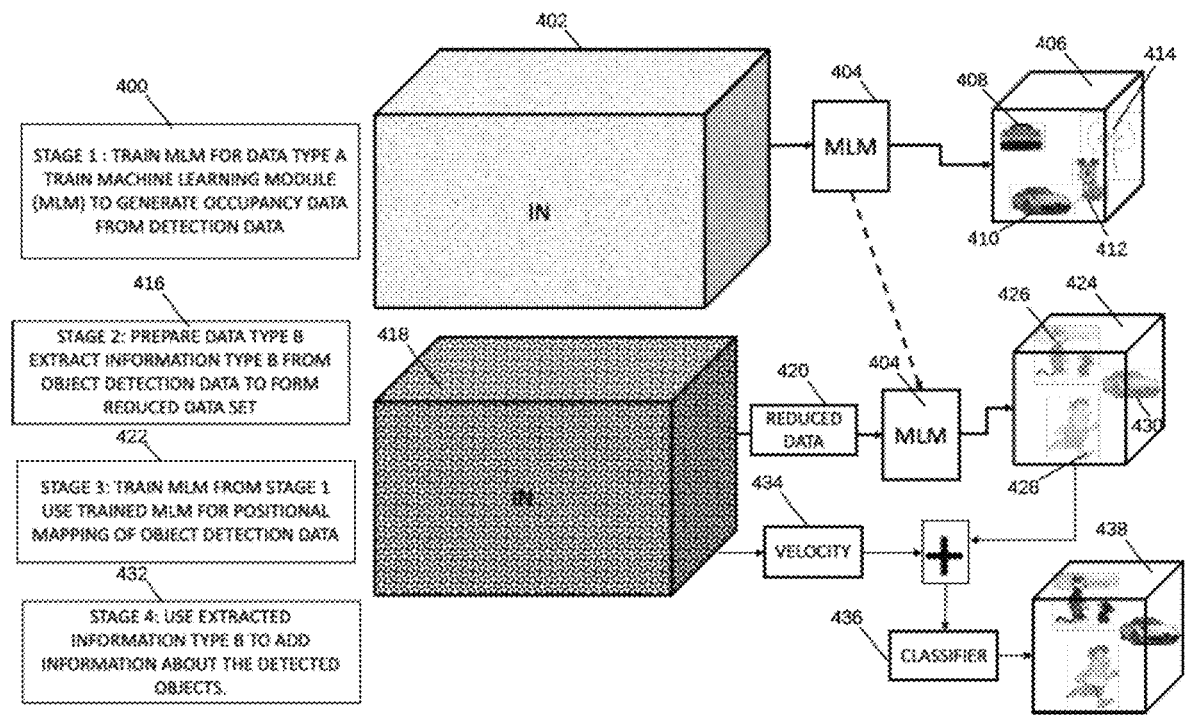
FIG. 4 is a schematic diagram for training the machine learning module ("MLM") as in FIG. 3 according to various implementations of the subject technology.

Attention is now directed to FIG. 4, which illustrates a schematic diagram for training the machine learning module as in FIG. 3 in accordance with various implementations of the subject technology. Training is accomplished in stages and with two data types: (1) lidar data referred herein as "data type A"; and (2) radar data referred to herein as "data type B". Data type A, as described above, includes lidar data tuples of the form $(r_i, \theta_i, \phi_i, I_i)$. Data type B is radar data with additional velocity information in data tuples of the form $(r_i, \theta_i, \phi_i, I_i, v_i)$. The first training stage, stage 400, trains the CNN in the MLM 404 with data type A. The goal of this training step is to generate object detection and identification data from acquired lidar data. That is, given detection data detected or acquired by the lidar 104 as inputs, the MLM 404 is trained to generate occupancy data representing the probabilities of objects that are detected in the detection data. The MLM 404 takes as input a data cube 402 containing the data tuples $(r_i, \theta_i, \phi_i, I_i)$ and generates occupancy data cube 406 with objects that are detected and identified from the data cube 402, including, for example, vehicles 408-410, animal 412 and tree 414.

Once the MLM 404 has been satisfactorily trained on data type A, the MLM 404 is retrained on data type B. The first step in this training, stage 416, consists in processing the radar data to form a reduced data set that is represented in a lidar data format. As the MLM 404 is trained in stage 400 with lidar point clouds, the data type B is reduced from a data cube 418 having data tuples of the form $(r_i, \theta_i, \phi_i, I_i, v_i)$ into a reduced data set or cube 420 similar to data cube 402 having data tuples of the form $(r_i, \theta_i, \phi_i, I_i)$. That is, the data type B is processed to extract the velocity information from the radar data. Once the data type B is reduced to a data type A format, the next stage 422 uses the trained MLM 404 to generate occupancy data 424 from the acquired and reduced set of radar data 420. Note that this process amounts to a positional mapping, where the raw data is mapped into a list or map of probabilities of object positions, such as objects 426-430.

With the MLM 404 now trained on reduced data set 420, the next stage enhances the object detection and identification capabilities of MLM 404 with the velocity information that is unique in radar data. In stage 422, the extracted velocity information 434 is added or combined with the occupancy data 424 to get a set of velocity vectors or micro-doppler information associated with the detected objects. This amounts to performing micro-doppler analysis on points which are identified as likely to contain an object. As only these points and their associated velocity vectors are analyzed, the input space to classifier 436 is orders of magnitude lower than the original acquired radar data cube 418, thereby making it for a very efficient object detection and classification on radar data that can be performed in real-time for objects up to 300 m in range or even longer in preliminary results. Analysis of this micro-doppler information can be very accurate for object classification in a fast classifier 436 to generate an enhanced occupancy data set 438 including location and velocity information for objects in the FoV of the vehicle.

Figure 5:
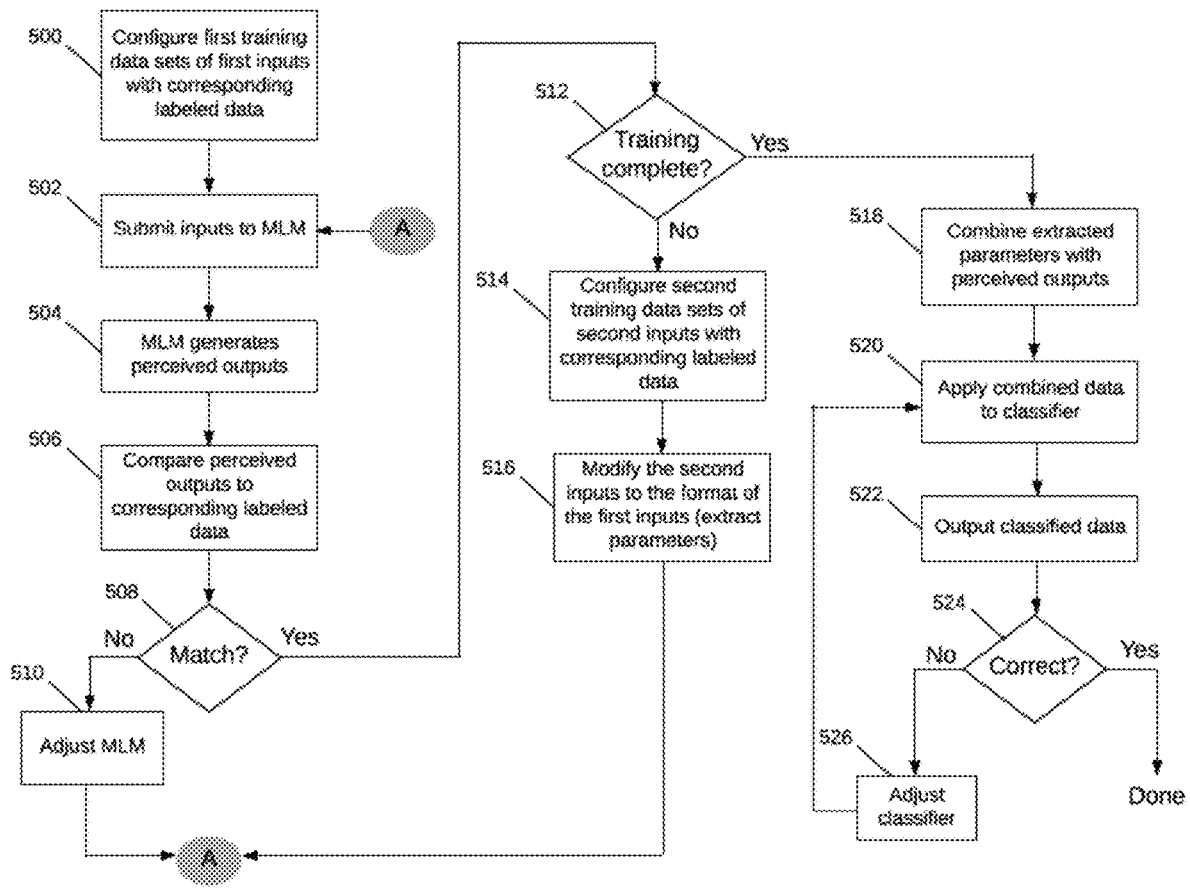
FIG. 5 is a flowchart for training an MLM implemented as in FIG. 4 and according to various implementations of the subject technology.
Figure 6:
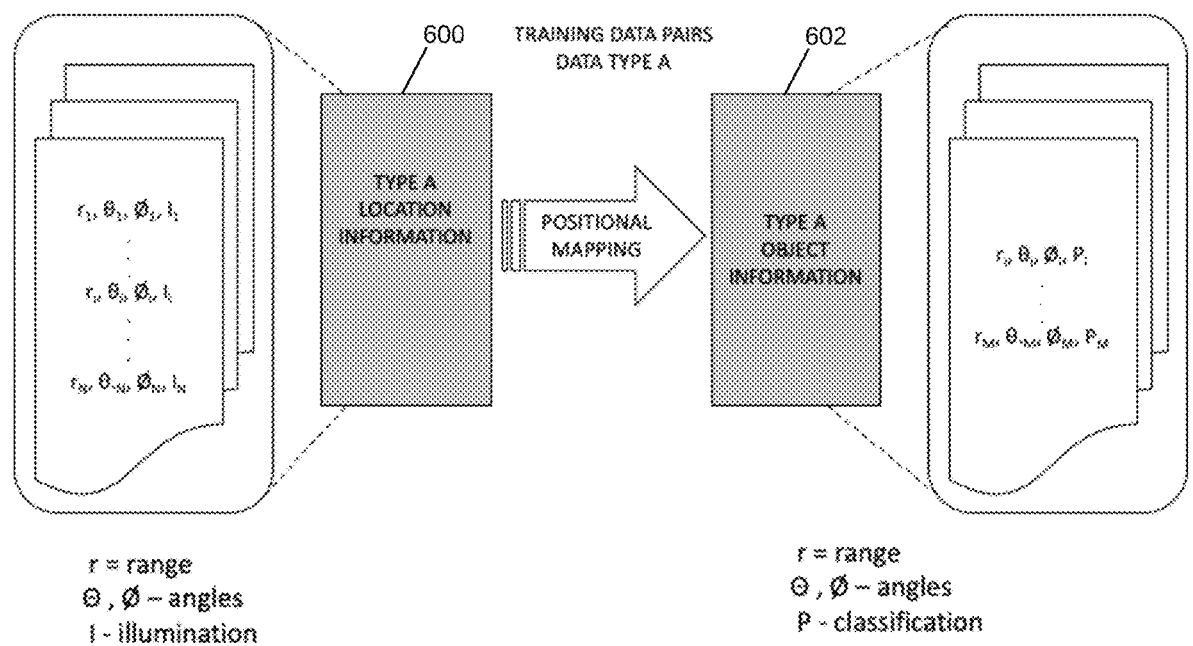
FIG. 6 illustrates the first training data sets for training the MLM according to various implementations of the subject technology.

A flowchart for training an MLM implemented as in FIG. 4 in accordance with various implementations of the subject technology is illustrated in FIG. 5. The MLM is trained on a first set of inputs (e.g., lidar data) and then retrained through transfer learning on a second set of inputs (e.g., radar data). The first step is to configure first training data sets of first inputs with corresponding labeled data (500). The labeled data is assumed to be correct and unambiguous with object labels identifying known objects in the data. The MLM effectively performs a positional mapping to map data inputs into an output set of object locations and classifications. FIG. 6 illustrates the first training data sets in accordance with various examples. The first set of inputs of lidar data, or data type A, has data tuples 600 of the form $(r_i, \theta_i, \phi_i, I_i)$. The MLM detects and classifies objects to generate a list of data tuples $(r_i, \theta_i, \phi_i, P_i)$, where P denotes the object class or category, e.g., whether a vehicle, pedestrian, cyclist and so forth. Note that the set 600 contains all the data that is used in training, whereas the set 602 is a smaller data set containing only data pertaining to objects that are labeled.

Figure 7:
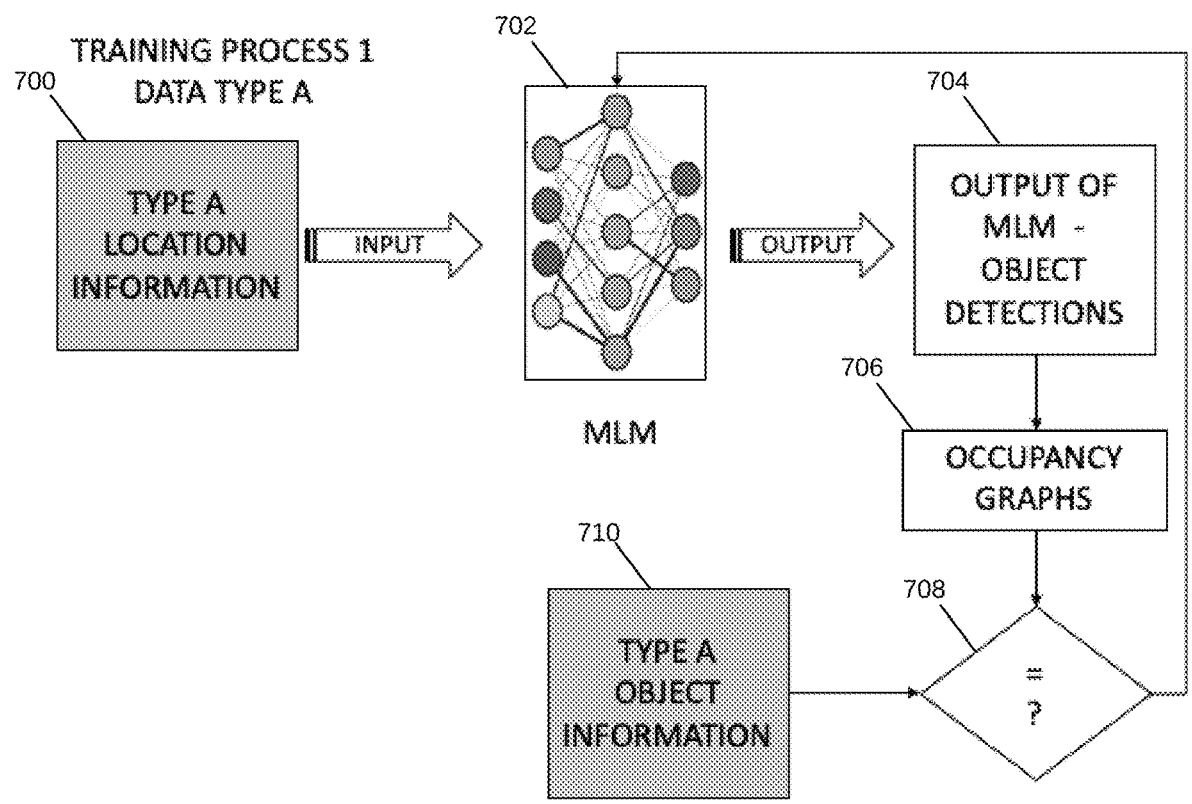
FIG. 7 is a schematic diagram illustrating the training performed by the MLM on lidar data according to various implementations of the subject technology.

Referring back to FIG. 5, the MLM is trained in a supervised learning mode by mapping the input data to the labeled data and producing an inferred function which can be used for mapping new examples. The configured first training data sets are submitted to the MLM (502) and the MLM generates a list of perceived outputs (504). The perceived outputs are compared to the corresponding labeled data (506) to determine if there is a match (508). Until there is no match, the MLM is adjusted by adjusting the weights in the convolutional layers (510) and steps 502-508 are repeated. FIG. 7 illustrates this training in more detail. The input data set 700 with the data tuples $(r_i, \theta_i, \phi_i, I_i)$ is input into the MLM 702 to generate the list of perceived outputs 704. This list can be thought of as occupancy graphs 706 or data of the form $(r_i, \theta_i, \phi_i, P_i)$ that is compared at 708 to the labeled data 710.

Referring back to FIG. 5, once the MLM is fully trained on this first set of training data and the overall training process is not yet complete (512), the training proceeds to configure a second set of training data sets of second inputs with corresponding labeled data (514). In various implementations, the second training data sets include radar data or data type B that needs to be modified to the format of the first inputs (516). As described above, this includes extracting parameters from the second set of training data such as velocity information. Training proceeds with this modified data by repeating steps 502-510.

Figure 8:
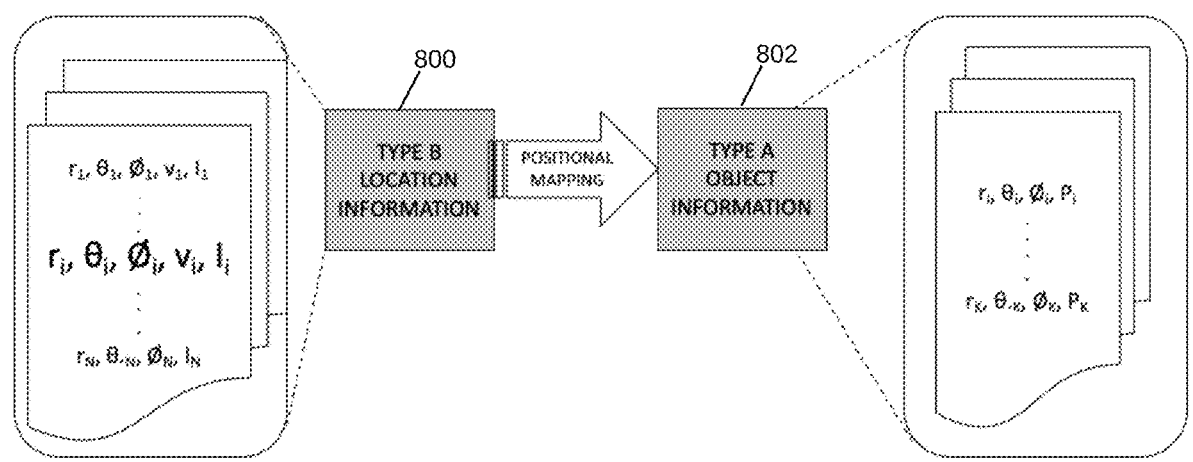
FIG. 8 illustrates the second training data sets for training the MLM according to various implementations of the subject technology.
Figure 9:
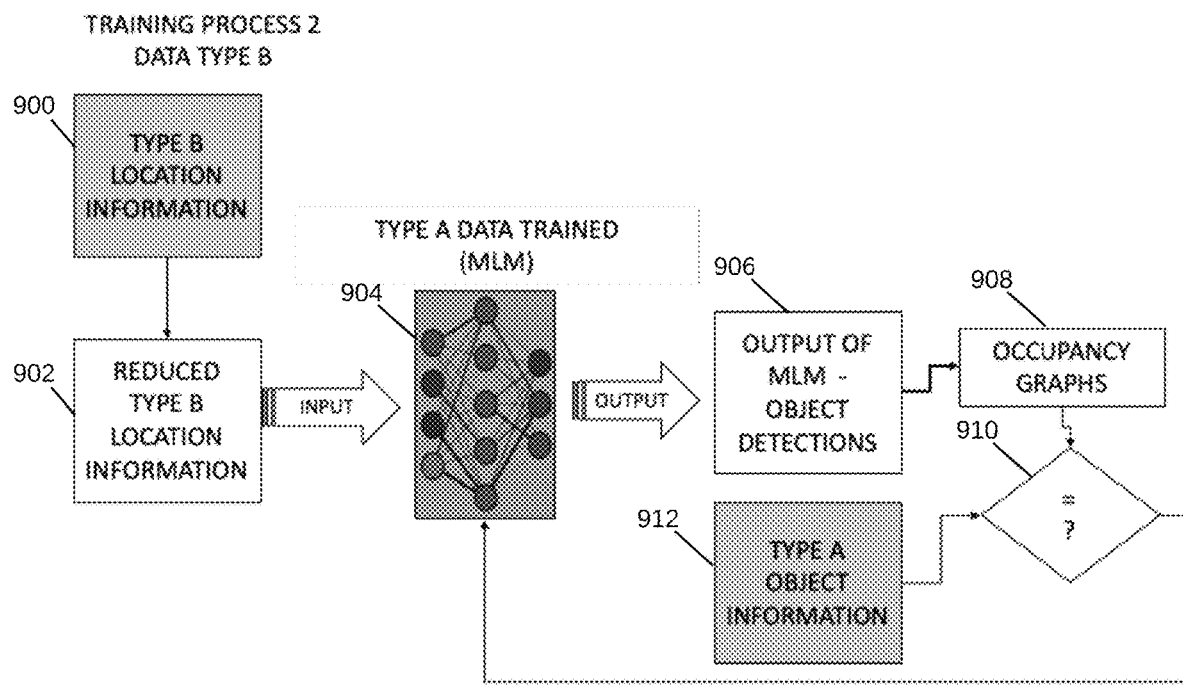
FIG. 9 is a schematic diagram illustrating the training performed by the MLM on radar data according to various implementations of the subject technology.

FIG. 8 illustrates the second training data sets in accordance with various examples. The second set of inputs of radar data, or data type B, has data tuples 800 of the form $(r_i, \theta_i, \phi_i, I_i, v_i)$. The MLM detects and classifies objects to generate a list 802 of data tuples $(r_i, \theta_i, \phi_i, P_i)$, where P again denotes the object class or category, e.g., whether a vehicle, pedestrian, cyclist and so forth. Note that the set 800 contains all the data that is used in training, whereas the set 802 is a smaller data set containing only data pertaining to objects that are labeled. Note also that the velocity information is first extracted before training the MLM on this data. Training on radar data is further illustrated in FIG. 9. The location data 900 is reduced into a set 902 that contains data tuples of the form $(r_i, \theta_i, \phi_i, I_i)$ without the velocity information. The reduced set is input into the MLM 904 to generate the list of perceived outputs 906. This list can be thought of as occupancy graphs 908 or data of the form $(r_i, \theta_i, \phi_i, P_i)$ that is compared at 910 to the labeled data 912.

Figure 10:
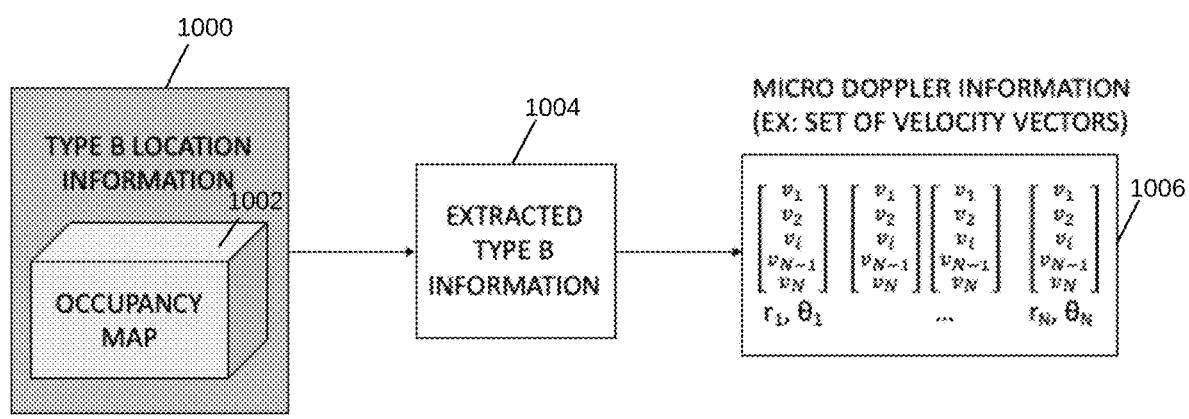
FIG. 10 shows the combination of occupancy data with extracted velocity information to generate micro-doppler information according to various implementations of the subject technology.

Referring back to FIG. 5, with the MLM fully trained on the second set of training data, the next step is to combine the extracted parameters (e.g., velocity information) with the set of perceived outputs generated by the trained MLM (518). This step is further illustrated in FIG. 10, with the set of perceived outputs 1002 combined with velocity information 1004 to produce micro-doppler information 1006. This information is a set of velocity vectors or micro-doppler slices where each object is identified by its location and velocity.

Referring back to FIG. 5, the combined data is then applied to the classifier (520) to output classified data. If the classified data is not correct (524), the classifier is adjusted (526). The classifier ultimately outputs a list of detected objects and their classifications including the objects' locations, velocity and category, i.e., whether a traffic signal, a vehicle, a pedestrian, a cyclist, a tree, an animal and so forth.

Figure 11:
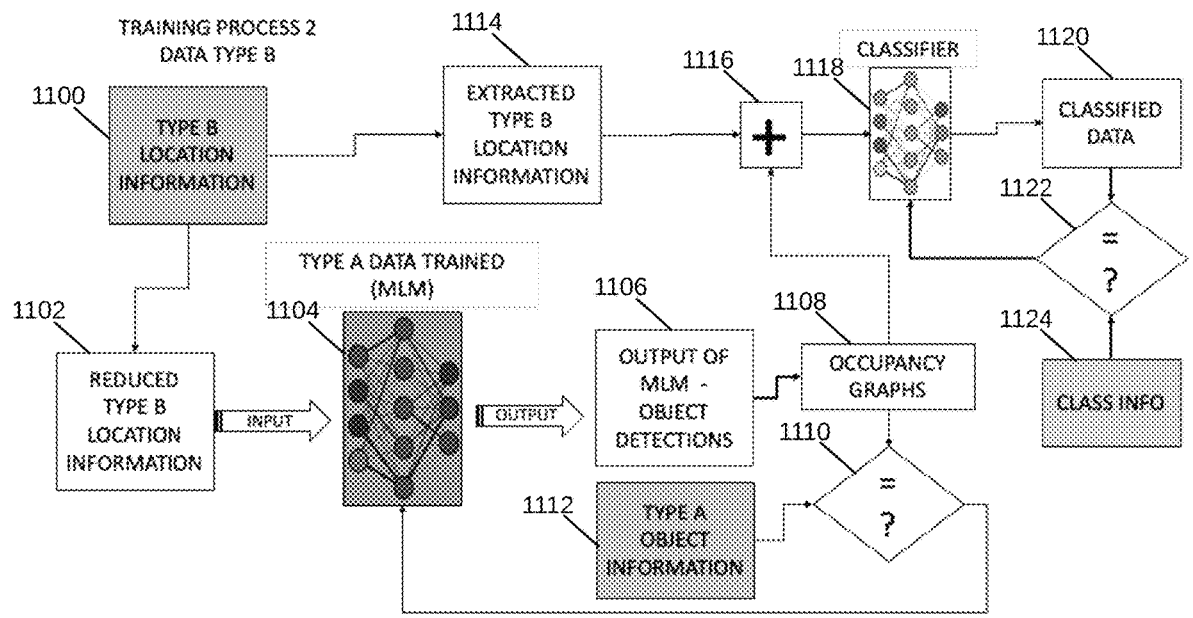
FIG. 11 is a schematic diagram illustrating the training of a MLM and a classifier on radar data according to various implementations of the subject technology.

FIG. 11 illustrates the training on the radar data in more detail. The input training data 1100 is first reduced to generate a reduced data set 1102 without velocity information. This reduced data set is input into the MLM 1104 that has already been trained on lidar data to generate the list of perceived outputs 1106. This list in the form of occupancy graphs 1108 is compared at 1110 to the labeled data 1112. Once the MLM 1104 has been trained to satisfaction, the occupancy data is combined at 1116 with the extracted velocity information 1114 to then be input into the classifier 1118. The result is classified data 1120 containing object location and identification information. This classified data can be compared at 1122 to labeled data 1124 to adjust the classifier 1118 until its performance is reliable and accurate. Note that the use of the classifier 1118 enhances the object detection and classification capabilities of MLM 1104 to produce an accurate and real-time classification of objects within the FoV of the vehicle.

Figure 12:
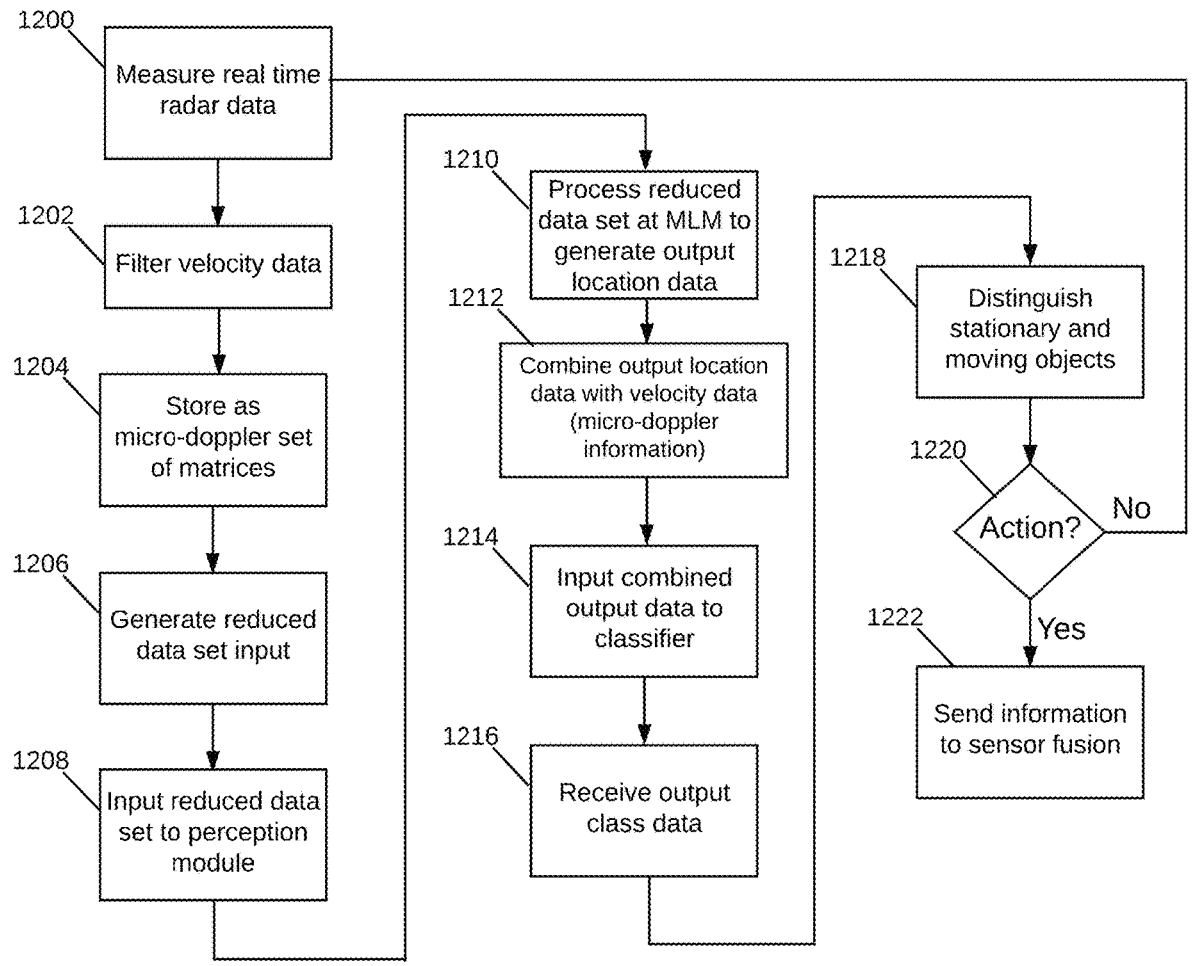
FIG. 12 is a flowchart for operation of a radar to detect and identify objects according to various implementations of the subject technology.

Attention is now directed to FIG. 12, which illustrates a flowchart for operation of a radar to detect and identify objects in accordance with various implementations of the subject technology. First, real time radar data is acquired (1200) by measuring reflected RF beams received by the radar from RF transmissions from its beam steering antenna. The velocity data is extracted and filtered (1202) and stored as micro-doppler information such as in the form of velocity vectors or matrices (1204). A reduced data set is generated (1206) and input into the perception module in the radar (1208). The reduced data set is processed by the MLM to determine a set of output object locations and classifications (1210). This output set is combined with the velocity data (1212) and the combined data is input to the classifier (1214) to generate output class data containing the objects' location and classifications (1216).

The output class data informs the vehicle of which objects are stationary or moving, and where they are located. Note that knowing how fast an object is moving and in which direction allows the vehicle to determine an action to take, including whether to change a driving plan. The next step after object detection and classification is thus to distinguish stationary and moving objects (1218) and to determine whether an action is to be taken by the vehicle (1220). The resulting object detection and classification information is then sent to sensor fusion (1222) for correlation with other sensors in the vehicle and vehicle controls for proceeding with determined actions (1224).

Figure 13:
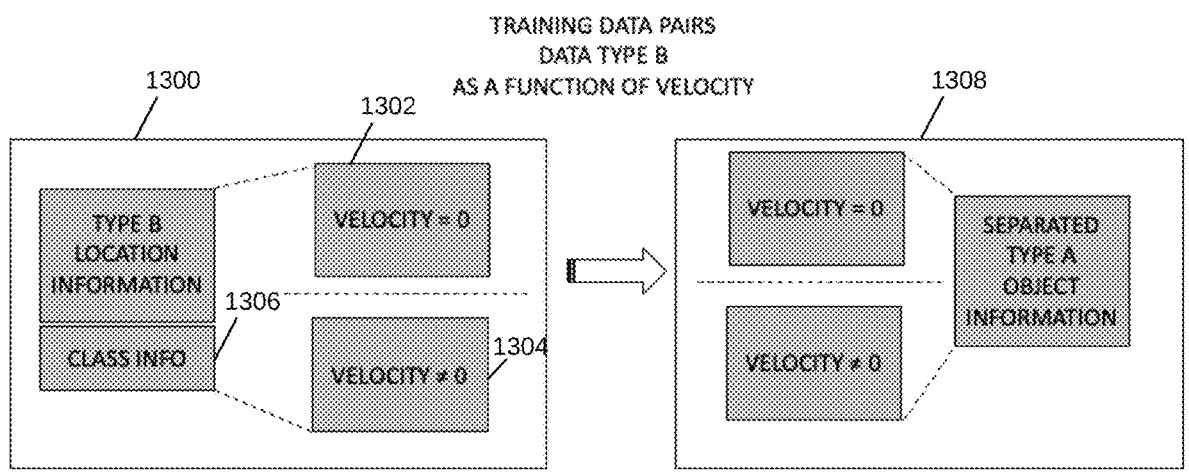
FIG. 13 illustrates the training data pairs for a motion-based training of the MLM according to various implementations of the subject technology.

Note that distinguishing stationary from moving objects (1218) can not only better inform vehicle decision making (1220), but it can also aid in the training of the MLM and classifier. FIG. 13 illustrates the training data pairs for a motion-based training of the MLM. Training data type B, i.e., radar data, is divided into stationary (1302) and non-stationary objects (1304) for each class 1306. During training, the data sets 1300 are compared to labeled data type A 1308, i.e., labeled lidar data, also divided into stationary (1310) and non-stationary (1312) objects.

Figure 14:
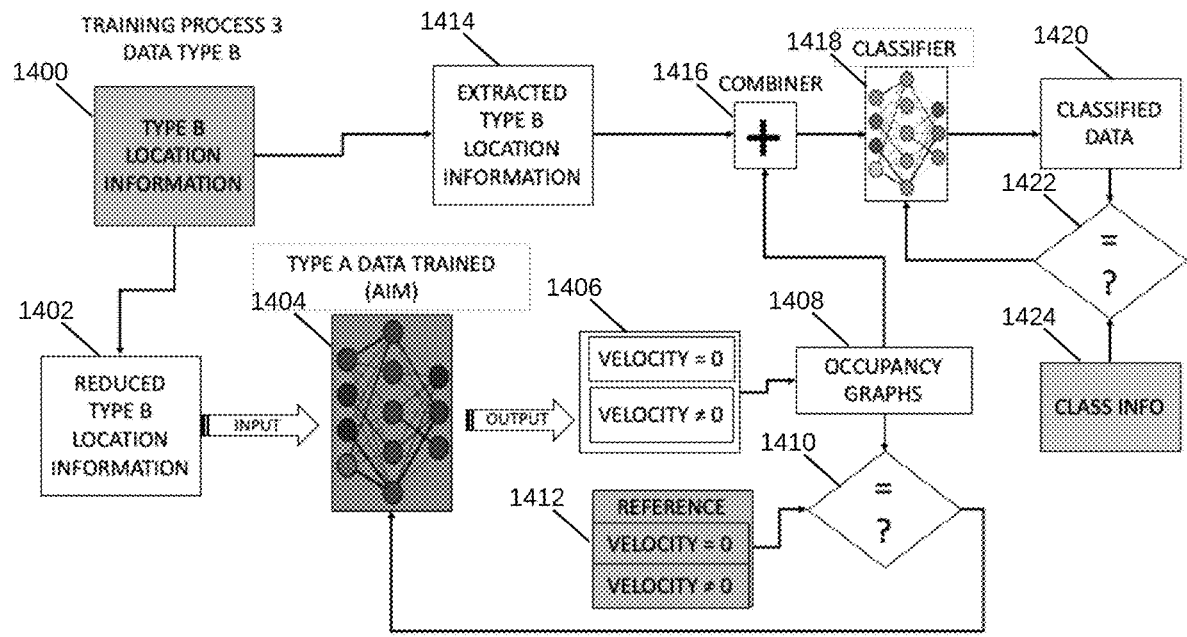
FIG. 14 illustrates the motion-based training of the LML on the radar data according to various implementations of the subject technology.

FIG. 14 illustrates the motion-based training on the radar data in more detail. The input training data 1400 is first reduced to generate a reduced data set 1402 without velocity information. This reduced data set is input into the MLM 1404 that has already been trained on lidar data to generate the list of perceived outputs 1406 that is divided into stationary and moving objects. This list in the form of occupancy graphs 1408 is compared at 1410 to the labeled data 1412. Once the MLM 1404 has been trained to satisfaction, the occupancy data for the moving objects is combined at 1416 with the extracted velocity information 1414 to then be input into the classifier 1418. The result is classified data 1420 containing object location and identification information. This classified data can be compared at 1422 to labeled data 1424 to adjust the classifier 1418 until its performance is reliable and accurate. Note that the use of the classifier 1418 enhances the object detection and classification capabilities of MLM 1404 to produce an accurate and real-time classification of objects within the FoV of the vehicle.

Figure 15:
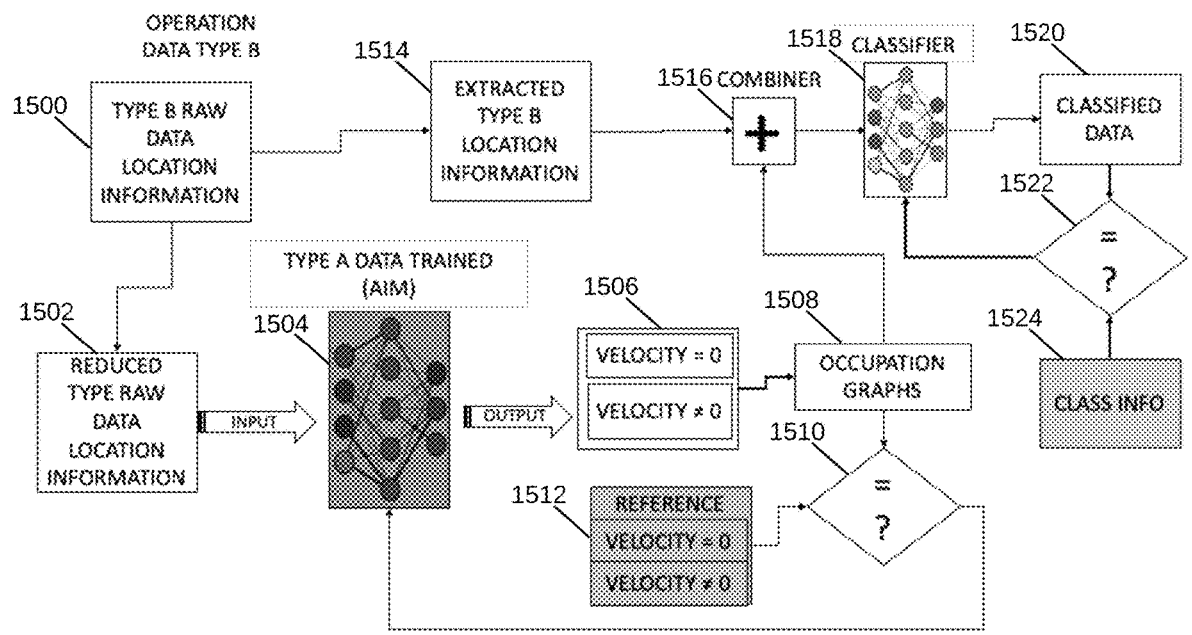
FIG. 15 illustrates the operation of the MLM to detect objects while distinguishing stationary and moving objects according to various implementations of the subject technology.

In operation and as shown in FIG. 15, raw data is acquired by the radar (1500) and the data is reduced to a data set 1502 without velocity information. This reduced data set is input into the MLM 1504 that has already been trained on lidar data and a training radar data set as discussed above with reference to FIG. 14. The MLM 1504 outputs a list of perceived outputs 1506 that is divided into stationary and moving objects. An occupancy graph 1508 is generated from this list 1506 and compared at 1510 to labeled data 1512. If the comparison does not produce a good match, the MLM 1504 needs to have its weights adjusted to ensure it performs well for other raw data that is acquired.

The occupancy graph for the moving objects is then combined at 1516 with the extracted velocity information 1514 to then be input into the classifier 1518. The result is classified data 1520 containing object location and identification information. This classified data can be compared at 1522 to labeled data 1524 to adjust the classifier 1518 until its performance is reliable and accurate. Note that the use of the classifier 1518 enhances the object detection and classification capabilities of MLM 1504 to produce an accurate and real-time classification of objects within the FoV of the vehicle.

These various examples support autonomous driving with improved sensor performance, all-weather/all-condition detection, advanced decision-making algorithms and interaction with other sensors through sensor fusion. These configurations optimize the use of radar sensors, as radar is not inhibited by weather conditions in many applications, such as for self-driving cars. The radar described here is effectively a "digital eye," having true 3D vision and capable of human-like interpretation of the world. While the examples above are illustrated with lidar data used to train a perception module before retraining it on radar data with additional velocity information, it is noted that camera data and information from other sensors can be used to further enhance the object detection and classification capabilities of the vehicle. It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. The present disclosure is not intended to be limited to the examples shown herein but is to be accorded the widest scope consistent with the principles and novel features disclosed herein.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Furthermore, to the extent that the term "include," "have," or the like is used in the description or the claims, such term is intended to be inclusive in a manner similar to the term "comprise" as "comprise" is interpreted when employed as a transitional word in a claim.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. Moreover, the separation of various system components in the aspects described above should not be understood as requiring such separation in all aspects, and it should be understood that the described program components and systems can generally be integrated together in a single hardware product or packaged into multiple hardware products. Other variations are within the scope of the following claim.

What is claimed is:

1. A radar system in an autonomous vehicle for object detection and classification, comprising:
    a radar module having a dynamically controllable beam steering antenna on the autonomous vehicle; and
    a processing system having at least one processor and a memory accessible to the at least one processor, the processing system for:
        processing a first set of data to acquire knowledge of possible objects;
        processing a second set of data, different from the first set of data, to remove velocity information from a second set of data to generate a reduced data set;
        processing the reduced data set to identify objects and to generate occupancy data; and
        processing the occupancy data to combine the occupancy data with a subset of velocity information corresponding to the identified objects to generate a combined data set; and
        processing the combined data set to classify the identified objects; and
        processing classification of the identified objects for decision-making in the autonomous vehicle.

2. The radar system of claim 1, wherein the dynamically controllable beam steering antenna is a_meta-structure antenna.

3. The radar system of claim 1, wherein the first set of data comprises acquired lidar data.

4. The radar system of claim 1, wherein the second set of data comprises radar data acquired by the radar module.

5. The radar system of claim 1, wherein the processing system comprises a convolutional neural network.

6. The radar system of claim 1, wherein the processing system is further configured to make adjustments during training on the first set of data by comparing an output set to a first set of labeled data.

7. The radar system of claim 1, wherein the processing system is further configured to make adjustments during training on the second set of data by comparing the set of object locations and classifications to a second set of labeled data.

8. An object detection and classification method, comprising:
    configuring a first set of training data with corresponding labeled data, wherein the first set of training data is data from a lidar sensor and includes, with respect to the lidar sensor, range to an object, azimuth angle to the object, elevation angle to the object;
    processing the first set of training data to generate a first set of object locations and classifications;
    processing a second set of training data from a radar sensor, wherein second set of training data is different from the first set of training data and includes velocity information;
    processing the second set of training data with corresponding labeled data;
    processing the second set of training data to modify a format of the second set of training data to a format of the first set of training data by extracting velocity information from the second set of training data;
    processing the second set of training data to generate a second set of object locations and classifications;

processing the second set of object locations and classifications to combine with a corresponding subset of the velocity information to generate a combined data set;

processing the combined data set so as to apply the combined data set to a classifier to output a set of classified data; and processing the set of classified data for decision-making in the autonomous vehicle.

9. The object detection and classification method of claim 8, wherein the first set of training data comprises lidar data.

10. The object detection and classification method of claim 8, wherein the sensor comprises a radar and the second set of training data comprises radar data.

11. The object detection and classification method of claim 8, wherein the first set of training data is free of velocity information.

12. The object detection and classification method of claim 8, wherein the processing system comprises a convolutional neural network.

13. The object detection and classification method of claim 8, wherein the format of the first set of training data comprises a range, an azimuthal angle, an elevation angle and an intensity, but is free of a velocity.

14. The object detection and classification method of claim 8, wherein the format of the second set of training data comprises a range, an azimuthal angle, an elevation angle, a velocity and an intensity.

15. An object detection and classification method for a computer processing unit, comprising:

acquiring radar data from a radar in an autonomous vehicle;

processing the radar data to filter velocity data from the radar data to generate a reduced data set;

processing the reduced data set to generate a set of perceived object locations and classifications;

combining the set of perceived object locations and classifications with a subset of the velocity data that corresponds to objects in the set of perceived object locations and classifications to generate a combined data set; and generating a set of object locations and classification by applying the combined data set to a classifier to output a set of classified data, and processing the set of classified data for decision-making in the autonomous vehicle.

16. The object detection and classification method of claim 15, wherein the reduced data set comprises a range, an azimuthal angle, an elevation angle, and an intensity.

17. The object detection and classification method of claim 15, further comprising processing the set of object locations and classifications to distinguish stationary and moving objects.

18. The object detection and classification method of claim 17, further comprising processing to determine whether to perform an action in the autonomous vehicle based on the distinguishing stationary and moving objects in the set of object locations and classifications.

19. The object detection and classification method of claim 18, further comprising sending the set of object locations and classifications to a sensor fusion module in the autonomous vehicle for use in decision-making for the autonomous vehicle.

20. The object detection and classification method of claim 15, further comprising:

processing training data from a lidar in the autonomous vehicle; and processing the training data to acquire knowledge of possible objects to generate the set of perceived object locations and classifications based on the acquired knowledge.

* * * * *